(No Model.)

T. V. ELLIOTT.
SAW CLEANER.

No. 458,523. Patented Aug. 25, 1891.

WITNESSES:
Donn Twitchell
E. M. Clark

INVENTOR:
T. V. Elliott
BY
Munn & Co.
ATTORNEYS

UNITED STATES PATENT OFFICE.

THADIOUS V. ELLIOTT, OF NICHOLS, SOUTH CAROLINA.

SAW-CLEANER.

SPECIFICATION forming part of Letters Patent No. 458,523, dated August 25, 1891.

Application filed February 14, 1891. Serial No. 381,405. (No model.)

*To all whom it may concern:*

Be it known that I, THADIOUS V. ELLIOTT, of Nichols, in the county of Marion and State of South Carolina, have invented a new and Improved Saw-Cleaner, of which the following is a full, clear, and exact description.

My invention is an improvement in the class of apparatus designed for removing gummy matter from wood-saws by means of steam ejected into contact with the teeth of the saws while running in the lumber.

I have devised and adopted the construction and combination of parts hereinafter described and claimed.

Reference is to be had to the accompanying drawings, forming a part of this specification, in which similar letters of reference indicate corresponding parts in both the figures.

Figure 1:
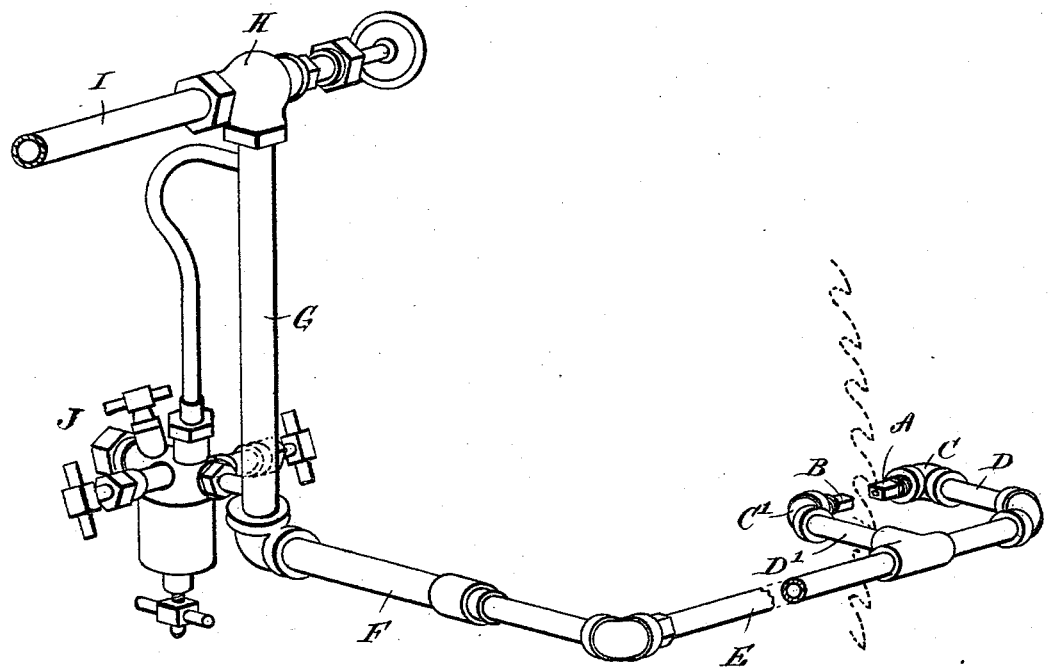
Figure 2:
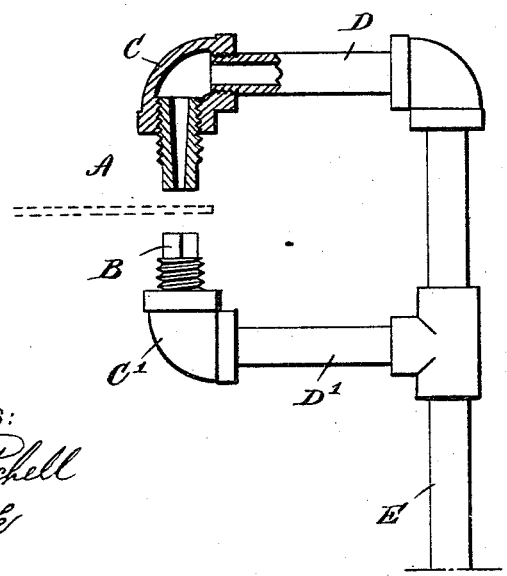

Figure 1 is a perspective view of the improvement; and Fig. 2 is an enlarged plan view, with parts in section, of the nozzles and pipe connection.

The improved saw-cleaner is provided with two nozzles A and B, preferably made in the shape of hollow plugs, as is plainly shown in the drawings, and arranged opposite each other at or near the sides of the cutting-edge of the saw. The nozzles A and B are threaded and screw into elbows C and C', respectively, held on parallel pipes D and D', respectively, connected with a pipe E, extending in line with the nozzles A and B, but at right angles to the pipes D and D'. The pipe E extends in front of the saw, which latter may be circular or vertical, the said pipe E connecting with a pipe F, extending at right angles to the pipe E and connecting with a vertical pipe G, containing at its upper end a valve H, connected by a pipe I with a steam-boiler, so that steam and water of condensation or hot water can pass from the said boiler through the pipe I, valve H, into the pipe G, and from the latter through pipes F and E into the pipes D and D', elbows C and C', to finally pass to the nozzles A and B, through which the steam or water or both combined are ejected onto the sides of the saw at or near the cutting-edge, as is plainly indicated in Fig. 1. The steam or water, or both combined, passing onto the saw, as above described, loosen the gummy matter on the saw-blade and wash the same off, so that the saw enters the log clean, thus insuring a perfect cut, at the same time requiring less power for running the saw. In order to facilitate the removal of the gummy matter and other impurities on the cutting-edge of the saw, the steam or water are mixed with a lubricant, such as oil. In order to accomplish this, a lubricator J of any approved construction is connected with the pipe G, so that oil passes from the said lubricator into the pipe G to mix with the steam or water or both and to be carried along to the nozzles A and B, in order to be finally ejected onto the cutting-edge of the saw-blade. The lubricator J is preferably of the construction shown in the patent, No. 255,353, granted to A. W. Swift on the date of March 21, 1882.

As the nozzles A and B are held adjustably in the elbows C and C', respectively, the said nozzles may be moved toward or from each other, so as to bring their ends near to or farther from the sides of the saw-blade, as may be desired. The openings in the nozzles A and B are preferably conical, as shown in Fig. 2, so that the cleaning mixture is ejected with considerable force onto the sides of the saw-blade.

I have found by experience that the steam or hot water or both combined may remove the gummy matter and impurities; but by adding oil the process is greatly facilitated, especially when the saw is used for cutting pine logs containing large quantities of turpentine, tar, rosin, and the like.

Having thus fully described my invention, I claim as new and desire to secure by Letters Patent—

In a saw-cleaner, the combination, with two nozzles arranged opposite each other at the sides of the saw near the cutting-edge, of pipes connected with the said nozzles and connected with the steam-supply, a valve held in the said pipe for regulating the amount of steam passing to the said nozzles, and a lubricator connected with the said pipe to mix the lubricant with the steam or water passing through the said pipe, substantially as shown and described.

THADIOUS V. ELLIOTT.

Witnesses:
  D. M. SMALL,
  COLON M. ELLIOTT.